Dec. 7, 1965         O. KALTENMARK ETAL         3,221,783
                CIRCULAR SAW WITH ANNULAR SAW BLADE
Filed Aug. 8, 1962                              4 Sheets-Sheet 3

INVENTOR
André Dupuy
Otto Kaltenmark
Ernest G Montague
BY
ATTORNEY

Dec. 7, 1965     O. KALTENMARK ETAL     3,221,783
CIRCULAR SAW WITH ANNULAR SAW BLADE Filed Aug. 8, 1962     4 Sheets-Sheet 4

Fig. 10.

INVENTOR
André Dupuy
Otto Kaltenmark

BY

ATTORNEY 3,221,783
CIRCULAR SAW WITH ANNULAR SAW BLADE
Otto Kaltenmark, Tubingen, and André Düpüy, Eningen, Germany, assignors to Karl M. Reich Maschinenfabrik, Nurtingen, Germany, a firm of Germany
Filed Aug. 8, 1962, Ser. No. 215,680
Claims priority, application Germany, Aug. 8, 1961, R 30,895; Aug. 9, 1961, R 30,903
15 Claims. (Cl. 143—44)

The present invention relates to a circular saw with an annular saw blade which comprises a housing carrying the driving motor, a plurality of rollers which are mounted in the housing and engage with the saw blade so as to guide the same, and at least one friction wheel which is driven by the motor and engages with the saw blade to drive the same.

It is one of the objects of the invention to provide a saw of the above-mentioned type in which the pressure at which the friction drive wheel is always applied upon the annular saw blade is in accordance with the load to which the saw is subjected during the cutting operation so that, when this load is relatively small, an unnecessary load upon the bearings of the drive wheel and of an associated back-pressure wheel will be avoided even though the contact pressure of the drive wheel upon the saw blade will always be as strong as required.

According to the invention this object is attained by mounting the friction wheel for driving the saw blade so as to be pivotable about a swivel axis which extends substantially parallel to its axis of rotation and is spaced from the plane of the annular saw blade at a distance which lies between the length of the radius of the drive wheel and the sum of this length and the distance between the axis of rotation and the swivel axis of the drive wheel, and by placing the axis of rotation of the drive wheel behind the swivel axis, as seen in the direction of movement of the surface of the drive wheel which engages with the annular saw blade.

This manner of mounting the drive wheel results in a toggle-joint effect, since the reaction force acting upon the axis of rotation of the drive wheel clamps the drive wheel between the saw blade and the swivel axis of the drive wheel. Furthermore, when as the result of the reaction force the drive wheel is moved slightly more closely toward the saw blade, the effective length of the lever arm on which the reaction force engages increases so that, as the cutting load on the annular saw blade increases, the contact pressure of the friction drive wheel also—and very strongly—increases.

In order to reduce the friction loss as much as possible when the drive wheel consists of a friction wheel, it is another feature of the invention that the plane which extends through the swivel axis and the line of engagement between the friction wheel and the annular saw blade extends relative to a vertical line which is drawn through the plane of the saw blade at an angle which is not greater than the so-called angle of friction which characterizes the friction between the surfaces of the drive wheel and saw blade. An important advantage which is attained by the invention is the fact that the presure at which the drive wheel is pressed against the annular saw blade always adjusts itself fully automatically in accordance with the load which acts upon the saw blade.

A further object of the invention is to provide a circular saw with an annular saw blade which is of the most simple design possible. This object is attained according to the invention by combining the motor with the drive wheel so as to form a structural unit which is pivotably connected to the housing of the saw so as to be pivotable about the swivel axis of the drive wheel.

A further improvement in the adjustment of the force pressing the drive wheel against the annular saw blade in accordance with the load acting upon the saw blade may be attained by providing the machine with at least one manipulating handle which is rigidly secured to the bearing structure through which the mentioned swivel axis extends, that is, for example, according to the embodiment of the invention as above described, to the structural unit which contains the motor with its reduction gear and the bearing of the drive wheel. The force which is normally exerted by the drive wheel upon the saw blade will in this manner be increased by the feeding force which is exerted upon the manipulating handle during the cutting operation.

It is still another object of the invention to provide suitable means for guarding the saw blade so as to prevent the operator of the saw or any other person from touching it in its radial direction while it is revolving. This protection from injury is attained according to the invention by providing the machine housing at one side of the saw blade with a blade guard and by connecting the blade guard to the machine housing in a manner so as to be both pivotable about and slidable along a pivot pin which is secured to the housing and extends perpendicularly to the plane of the saw blade. When the blade guard is swiveled fully outwardly before and after any sawing operation is being carried out, its outer edge surrounds the saw blade and thus not only prevents the revolving saw blade from cutting but especially also from being touched by the operator at least in its radial direction. In order to carry out a sawing operation, however, it is only necessary to shift the blade guard along its pivot pin slightly away from the saw blade so that it may then be swiveled inwardly toward or even beyond the axis of the saw blade by its engagement with the workpiece.

In order to prevent the blade guard or its edge from coming in contact with the saw blade and in order to insure that in the above-mentioned guarding position the edge of the blade guard always envelopes the cutting edges of the saw blade, the invention further provides a spring which presses the blade guard in the direction toward the saw blade, and a stop member which by engaging with a surface on the housing prevents the blade guard from ever engaging with the saw blade. By further providing a recess in the mentioned surface which is adapted to receive the stop member when the blade guard is in its fully guarding position, the blade guard will be locked in this position by the action of the mentioned spring.

A further object of the invention is to design the saw so as to be adjustable to different cutting depths. This object is attained by providing the machine with a base plate which is pivotable about the swivel axis of the blade guard and is thus adapted to be adjusted to and locked in any position in accordance with the desired cutting depth of the saw blade. In order also to permit cuts to be made at different inclinations, this base plate is further designed so as to be pivotable about an axis which extends parallel to the plane of the saw blade. A very simple and practical construction for the last-mentioned purpose consists in mounting the base plate on a pair of pivots which extend parallel to the plane of the saw blade and one of which serves for the additional purpose of forming a guide and stop member for guiding the blade guard and limiting the extent of its pivoting movement.

Inasmuch as the guide rollers for the saw blade are subjected to a considerable wear, it is another object of the invention to mount these rollers in a manner so as to permit them to be easily and quickly exchanged when necessary. This object is attained by combining at least one guide roller with its bearing means so as to form a structural unit which may be easily withdrawn from the saw housing.

In a saw of the type as herein described in which the guide rollers for the saw blade form a pair which engages upon the latter at the opposite sides thereof, it is very important that these rollers can be very accurately adjusted relative to each other and to the saw blade. If according to the last-mentioned feature of the invention these rollers together with their bearing means form structural units which may be easily exchanged as such, this normally requires each unit and its mounting in the saw housing to be very accurately constructed. In order to simplify the manufacture of these units so that they do not have to be made of such a great accuracy, the invention further provides an eccentric bushing which may be inserted into an aperture in a wall of the saw housing and is adapted to receive the bearing casing of such a roller unit. By means of this eccentric bushing it is possible to adjust the position of the respective guide roller very accurately in a lateral direction relative to the corresponding roller and to the intermediate saw blade. This is of great importance not only during the original assembly of the saw, but it also permits the guide rollers to be readjusted when they are worn after prolonged use.

In order to facilitate the exchange of the various rollers, it is a further feature of the invention that the saw housing is preferably made of two parts which are connected to each other so that one housing part may be pivoted relative to the other about a hinge axis extending parallel to the plane of the saw blade, and which may be locked in the closed position by a single member, for example, a bolt or a suitable quick-acting locking device. When the two parts of the saw housing are pivoted to the open position, the various rollers for guiding and driving the saw blade will be fully exposed and easily accessible and the saw blade will then also lie completely loose and may be easily exchanged.

Another feature of the invention consists in connecting the spring which determines the pressure at which the drive wheel is pressed against the saw blade at one end to the motor housing and to hook its other end upon a projection on the pivotable part of the saw housing which is spaced from the hinge axis thereof. When the pivotable housing part is open, the mentioned projection thereon will also be swung in the direction toward the motor housing so that the spring will be released and become unhooked from the projection, thus permitting the housing to be freely opened. When the pivotable housing part is being closed, however, after the spring is again hooked upon the projection, the pivoting movement also automatically retightens the spring to its proper tension.

A further object of the invention consists in designing and mounting the guide rollers for the saw blade in a manner so as absolutely to prevent the saw blade from falling out of its proper position in the saw housing. This object is attained according to the invention by providing at least one side of the annular saw blade with a circular groove which extends concentrically to the blade, and by providing at least one of the guide rollers with a circular flange which is adapted to engage into this groove to guide the saw blade. According to another feature of the invention, this object is attained by providing at least one supporting roller for the saw blade which engages with the latter on the inner edge thereof.

For the purpose of determining the thickness of a disk or a board which is to be cut off by the saw, it is still another object of the invention to provide a suitable guide or stop member which is adapted to be connected to one end of the saw housing and then extends parallel to the plane of the saw blade, and which may be connected to either side of the saw blade and be adjusted to any desired distance therefrom.

The aforementioned as well as still further objects, features, and advantages of the present invention will become more clearly apparent from the following detailed description of one preferred embodiment of the invention as illustrated in the accompanying drawings, in which:

FIG. 9 is a diagrammatically simplified plan view of the means of mounting the drive wheel; while

As illustrated in the drawings, the saw according to the invention comprises a two-part housing 1, in which an annular saw blade 2 is rotatably mounted by means of beveled guide rollers 3 and 4 (FIG. 5) which engage upon the opposite sides of the saw blade, a cylindrical supporting roller 5 which engages upon the inner peripheral edge 2' of blade 2, and a back-pressure roller 7 (FIGS. 6 and 9) which is associated with and mounted opposite to a friction wheel 6 which is adapted to drive the saw blade. Rollers 4 and 7 are provided with radially projecting guide flanges 4' and 7', respectively, which engage into a groove 8 which is provided in one side of the saw blade and extends concentrically thereto. In order to guide the saw blade 2 accurately within the cut and to prevent it from being bent during the sawing, the central area which is surrounded by the annular saw blade 2 is filled out by a circular guide plate 9 which is rigidly secured to the housing part 1. Aside from supporting the saw blade and the various elements for driving and guiding the same, the housing 1, 1' is also provided at the inside around the teeth of the saw blade 2 with a sawdust channel 10 (FIGS. 5 and 6) which has a lateral discharge opening 10' in the housing part 1'.

The beveled drive wheel 6 is mounted on the drive shaft 11 (FIG. 6) of an electric motor 12 which, if necessary, may be provided with a speed-reduction gear. As shown particularly in FIGURE 7, the drive unit containing the members 6, 11, and 12 is pivotably connected to the segmentally-shaped housing part 1 by means of a pair of bracket arms 15 on the housing part 1 which are rotatable about a pivot pin 14 which is secured at one end in the end wall of the motor housing and with an intermediate part within an elongated bracket 13 which projects from the bearing housing of drive shaft 11.

Figure 9:
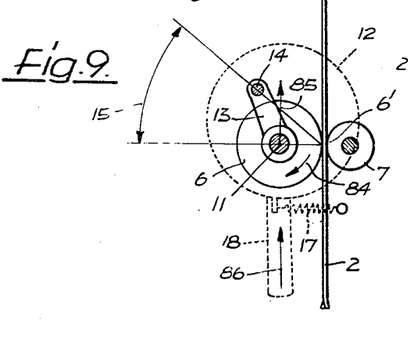

As illustrated in FIG. 9, the swivel axis 14 of friction wheel 6 is spaced from the plane of the saw blade 2 at a distance greater than the length of the radius of the friction wheel 6 and less than the sum of this length and the distance between the axis of rotation 11 and the swivel axis 14 of the friction wheel 6. Consequently, when the friction wheel 6 engages upon the saw blade 2, the plane extending through the swivel axis 14 and the line of engagement 6' between the friction wheel 6 and the saw blade 2 is inclined at an angle 15 relative to a line which extends vertically to the plane of the saw blade. In order to maintain the friction wheel 6 always in this position of engagement with the saw blade 2, a tension spring 17 is provided which is secured at one end to the motor 12 and at the other end to a projecting hook 17' (FIGS. 2 and 6) on the housing part 1'. The housing of the motor 12 is provided with a handle 18 for guiding the saw.

Figure 5:
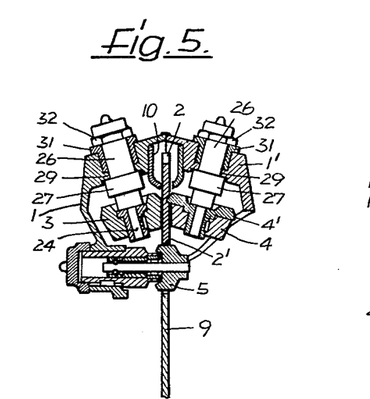
FIG. 5 is a cross section taken along line V—V of FIG. 1.
Figure 8:
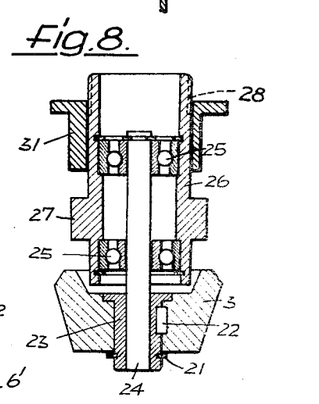
FIG. 8 is an enlarged cross section of a bearing casing as illustrated in FIG. 5.

As shown particularly in FIG. 8, each guide roller 3 and 4 is removably secured by means of a snap ring 21 and a spline 22 on a flanged bushing 23 which is rigidly secured to a shaft 24. Thus, guide rollers 3 and 4 may be easily exchanged when worn. Shaft 24 is rotatably mounted in ball bearings 25 in a bearing casing 26 which is provided with a flange 27 and with an outer screw thread 28 on its end opposite to that carrying the roller 3 or 4. For receiving the two bearing casings 26, the two parts 1 and 1' of the saw housing are provided with corresponding apertures 29, as shown in FIGURE 5, into each of which a bushing 31 engages. The bore of each of these bushings 31 is eccentric to the outer surface thereof, as shown in FIG. 8, so that, when the bushing 31 is turned within the aperture 29, shaft 24 may be easily adjusted in the direction vertical to its axis to vary the pressure of engagement of guide rollers 3 and 4 upon the saw blade 2. The bearing casings 26 are secured within the two housing parts 1 and 1' by cap nuts 32 which are screwed from the outside of the housing upon the threads 28.

Figure 2:
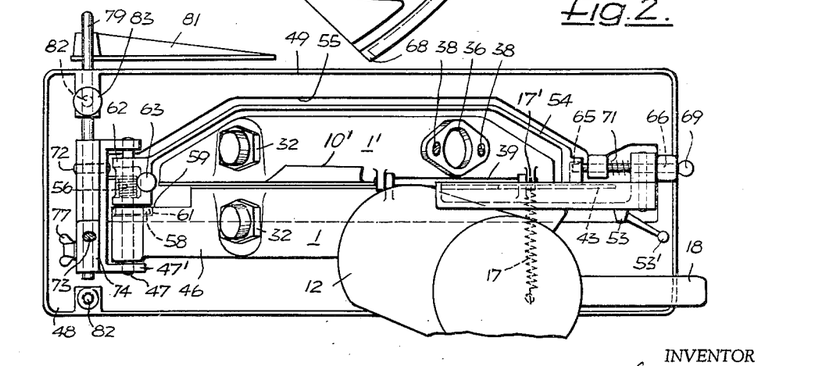
FIG. 2 is a top plan view thereof.
Figure 6:
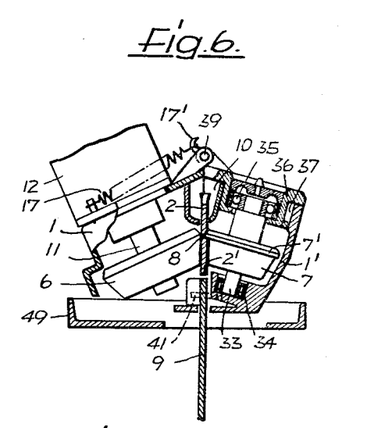
FIG. 6 is a cross section taken along line VI—VI of FIG. 1.
Figure 7:
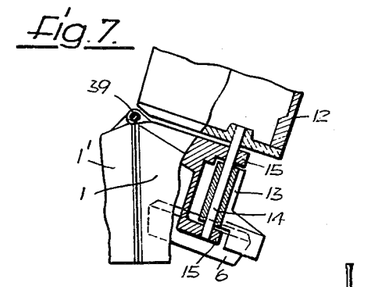
FIG. 7 is a cross section taken along line VII—VII of FIG. 1.

Since the friction wheel 6 is pressed resiliently against saw blade 2 by spring 17, there is no need for any lateral adjustability of the back-pressure roller 7 and its bearing structure may therefore be of a simple design. Roller 7 is secured to a shaft 33, the two ends of which are mounted in ball bearings 34 and 35 (FIG. 6). Bearing 35 is mounted in a bearing casing 36 which is inserted into an aperture 37 in the housing part 1' and is secured therein by means of a pair of screws 38, as shown in FIGURE 2. Roller 7 may thus be just as easily exchanged on its shaft 33 as rollers 3 and 4.

The purpose of making the saw housing of two parts 1 and 1' is manifold. It permits the exchangeable units consisting of the rollers 3, 4, and 7 together with their respective shafts and bearings to be easily exchanged when worn; it permits the housing and the various parts therein including the sawdust channel 10 to be easily cleaned; and most important of all, it permits the saw blade 2 to be easily and quickly removed and replaced. As already indicated, the housing part 1 which carries the rollers 3 and 5 and partly encloses the drive wheel 6 is pivotably connected to the motor 12 by the brackets 15 and the pivot pin 14 so that under the action of spring 17 the friction drive wheel 6 will be pressed against the saw blade 2. The other housing part 1', which carries the rollers 4 and 7, is connected to the first part 1 by a rod 39 (FIG. 6) so as to be pivotable about the axis of the rod 39 which extends parallel to the plane of the saw blade and transverse to the pivot pin 14. In the closed position the pivotable housing part 1' may be secured to the housing part either by a single bolt 41, as shown particularly in FIGS. 6 and 10, or by a suitable quick-acting lock. When the housing part 1' is tilted to its open position, the saw blade 2 lies so loosely around the guide plate 9 that it will almost fall off its own accord. After its removal, all of the rollers are easily accessible.

If one of the rollers 3 or 4 is worn to such an extent that it can no longer be adjusted by turning its eccentric bushing 31, whereby the shaft 24 carrying the roller will be shifted laterally toward the saw blade 2 until the roller rests with the proper contact pressure upon the saw blade 2, the entire roller unit as shown in FIG. 8 may then be easily withdrawn from the eccentric bushing 31 after the housing part 1' has been opened and the nut 32 has been unscrewed from the upper end of the bearing casing 26. After a new roller unit 3 or 4 has been inserted, it may be similarly adjusted by turning its eccentric bushing until the roller exerts the proper contact pressure upon the saw blade 2. By turning the eccentric bushing 31 in one direction or the other, it is also possible to compensate for minor manufacturing inaccuracies of the new roller.

If the back-pressure roller 7 also has to be exchanged, it is merely necessary to remove the two screws 38 and, when the housing part 1' is fully opened, to unscrew the wall of the sawdust channel 10 which is secured to this housing part, whereupon the entire roller unit may be easily withdrawn and replaced.

If, however, after the removal of the respective roller unit it is found that the bearing or bearings thereof are still in order, it is merely necessary to replace the worn roller 3, 4, or 7 by a new roller and to reinstall the repaired unit.

If the housing part 1' is opened merely for the purpose of exchanging or resharpening the saw blade and it is again closed and locked after the saw blade has been reinserted, the various rollers in the two housing parts will not require any readjustment, but will be immediately in the proper position relative to each other and relative to the saw blade which by the simple procedure of closing and locking the housing part 1' will be properly centered around the guide plate 9 and gripped between the various rollers including the drive wheel 6 and its back-pressure wheel 7 so that the saw will again be ready for operation.

The pivotable arrangement of the housing part 1' has the further advantage that, since the spring 17 which presses the drive wheel 6 against the saw blade 2 is hooked over the hook 17' which projects from the housing part 1' eccentrically to the hinge axis formed by rod 39, the closing of the housing part 1' automatically tightens the spring to its proper tension so that the drive wheel 6 will engage upon the saw blade 2 with the required pressure, while when the housing part 1' is being opened, spring 17 will be released and automatically become unhooked from hook 17' and will thus not interfere with the opening movement of the housing part 1', and the entire drive unit will then be free to be swung entirely out of and away from the housing part 1 to permit the friction drive wheel 6 to be easily exchanged, if necessary.

On its rear end, the housing part 1 has an extension 42 (FIG. 1) on which an arcuate cleaver 43 extending around a part of the circumference of the saw blade 2 is secured by screws 44 which extend through an arcuate slot 45 in cleaver 43 and permit the latter to be adjusted peripherally around the saw blade 2. Facing the saw blade, cleaver 43 has a wedge-shaped edge which is disposed in a plane between the planes of the two sides of the saw teeth.

On its front end the housing part 1 also has integrally thereon a forwardly projecting arm 46 which carries a pivot pin 47 which extends perpendicularly to the plane of the saw blade 2 and to which by means of a two-armed bracket 47' (FIG. 2) the front end 48 of a base plate 49 is pivotably connected. On its rear end, base plate 49 carries a segmentally-shaped member 51 which is pivotable about a pin 51' which is mounted on the base plate 49 and extends parallel to the pivot pin 47. This member 51 has an arcuate slot 52 into which a clamping screw 53 with a handle 53' engages which screw 53 is screwed into the extension 42 and permits the base plate 49 to be adjusted to any desired angle relative to the housing 1 which may be indicated by the scale (not shown) on the arcuate front surface of member 51.

Figure 1:
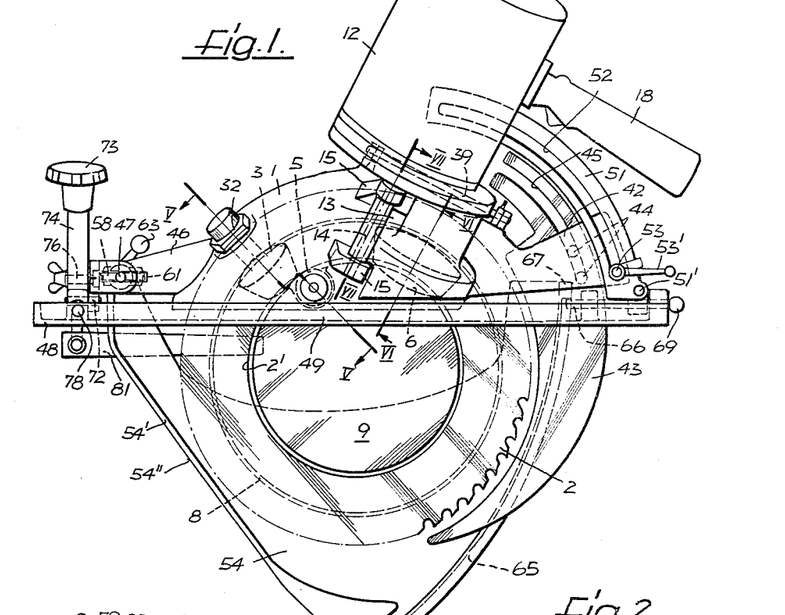
FIG. 1 is a side view of the machine, according to the invention.

At the right side of the plane of saw blade 2 opposite to the side on which motor 12 is located, a blade guard 54 (FIGS. 1 and 2) is provided which has an edge 54' (FIG. 1) projecting toward the saw blade 2. Integrally on its front end, blade guard 54 has a hub 62 which is slidable along and pivotable about the same pivot pin 47 on the housing part 1 which also carries brackets 47' on the front end of base plate 49. For allowing the upper edge of blade guard 54 to pass through the base plate 49, the latter is provided with an aperture 55 (FIG. 2) so that the blade guard 54 can be swiveled entirely upwardly. As shown in FIGURE 2, hub 62 has at one side a recess in which a coil spring 56 is mounted on pivot pin 47. One end of spring 56 is secured to the bracket 47', while its other end acts upon hub 62 to press the same and thus the entire blade guard 54 in the direction toward the saw blade 2. This movement of blade guard 54 can, however, occur only when the blade guard is in its normal guarding position because of a projection 58 on hub 62 which in this position is adapted to engage into a corresponding recess 61 in the front end of arm 46 of the housing part 1, whereas in any other pivoted position of blade guard 54 the end surface of the projection 58 engages upon the flat upper surface 59 of the front end of arm 46, and thus prevents the blade guard 54 from being pressed by spring 56 toward the saw blade. When blade guard 54 is in the mentioned normal guarding position, as shown in FIGS. 1 and 2, and is pressed by spring 56 toward the saw blade 2 to the extent as limited by the engagement of hub 62 with the flat surface 59 of arm 46, the projecting edge 54' of the blade guard 54 surrounds the saw blade 2. By the engagement of the projection 58 in recess 61, the blade guard 54 is also arrested in this guarding position and thus prevented from any accidental movement thereof. When blade guard 54 is pivoted upwardly after being lifted out of the recess 61, the coil spring 56 also acts as a torsion spring which tends to pivot the blade guard 54 downwardly to its guarding position. Hub 62 is further provided with a knob 63 to facilitate the manipulation of shifting the blade guard laterally to disengage the projection 58 from the locking recess 61 when a cutting operation is to be carried out and the blade guard 54 should then be pivoted out of its guarding position.

Figures 3, 4:
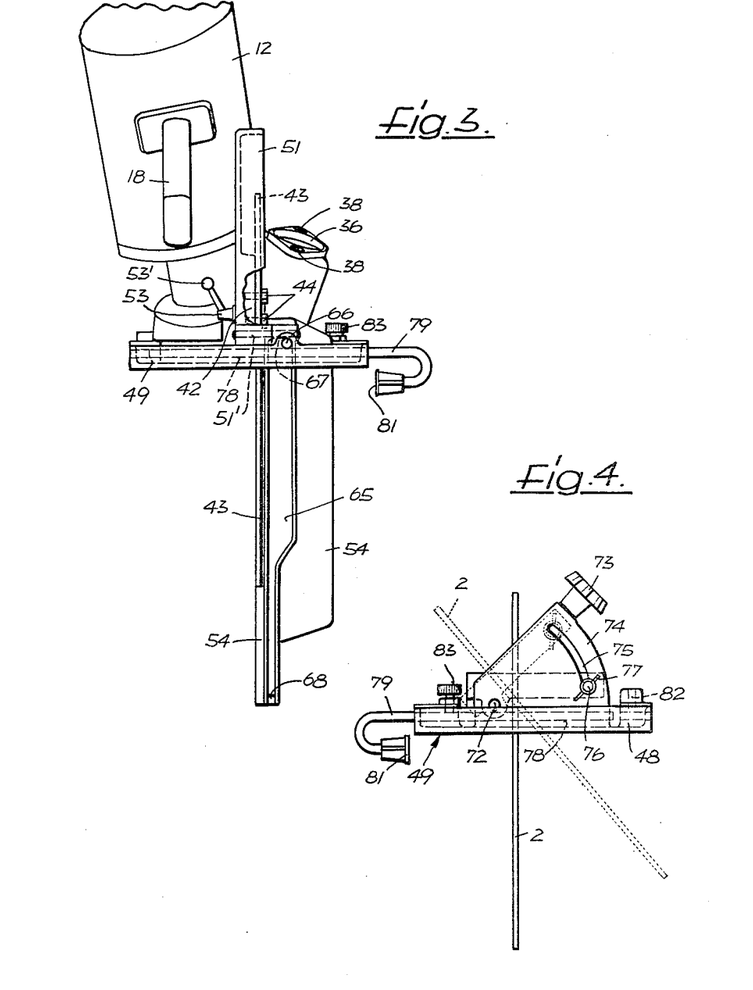
FIG. 3 is an end view of the machine, as seen from the right of FIG. 1.
FIG. 4 is a detail front view of the front parts of the machine, the rear parts being omitted for a clearer illustration.
Figure 10:
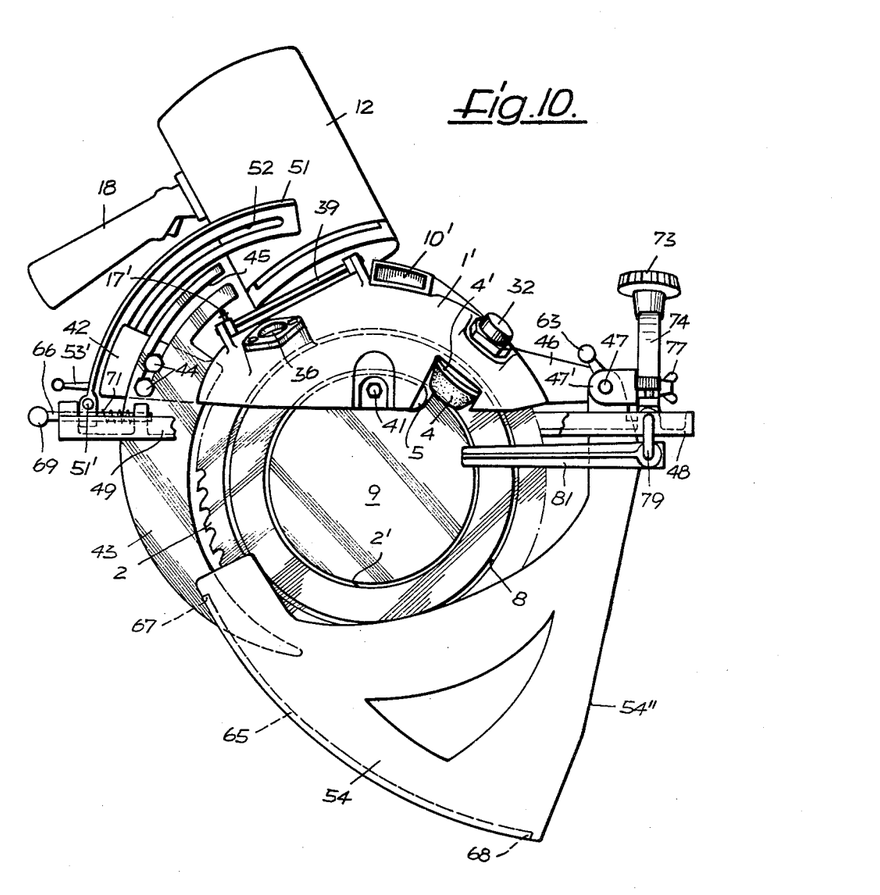
FIG. 10 is another side view of the machine, as seen from the rear of FIG. 1, but with the blade guard swiveled downwardly to its fullest extent and with the central part of the base plate being broken away for a clearer illustration.

In order to guide the blade guard 54 more securely and to provide end stops for limiting the extent of its pivoting movement, its rear side is provided with a groove 65 as shown particularly in FIGURE 3, into which a pin 66 engages which extends in housing 1 parallel to the plane of the saw blade 2. The upper part of groove 65 is so wide that it permits the blade guard 54 to be shifted along the pivot pin 47 sufficiently to lift the projection 58 out of the locking recess 61. The opposite ends 67 and 68 of groove 65 form stops to limit the extent of the pivoting movement of blade guard 54. Near its lower end carrying the stop 68, groove 65 narrows down to such an extent that, when blade guard 54 is pivoted so that pin 66 engages into this narrow part, the blade guard can no longer move laterally. Pin 66 has a knob 69 (FIGS. 1 and 2) and may be pulled out of groove 65 against the action of a spring 71, for example, when it is necessary to pivot the blade guard 54 entirely outwardly to the position as shown in FIG. 10 in order to permit the saw blade 2 to be exchanged. Pin 66 also serves as a pivot pin and is coaxial with another pivot pin 72 and parallel to the plane of the saw blade 2, which pivot pin 72 is secured in bracket 47'. Both pivot pins 66 and 72 engage into parts of base plate 49 near the opposite ends thereof and permit the base plate 49 to be pivoted about their common axis to any desired angle relative to the plane of the saw blade 2. For locking the blade plate 49 in a desired position, the front end 48 of the base plate 49 is provided with a segmentally-shaped projection 74, as shown particularly in FIG. 4, which carries a larger knob 73 for manipulating the saw. This projection 74 is further provided with an arcuate slot 75, the center of curvature of which is coaxial with pivot pin 72. A screw 76 which is secured in bracket 47' extends through this slot 75, and a wing nut 77 is screwed upon screw 76 for locking the projection 74 and thus the entire base plate 49 at any desired angular position about the axis of pins 66 and 72. Stop 68 at the lower end of groove 65 is disposed in such a position that, when this stop engages upon pin 66, the front edge 54" of blade guard 54 is in alignment with the lower side of base plate 49 and thus forms a cover for the aperture 55 in the base plate 49 when the blade guard 54 is swiveled fully upwardly.

As also shown in FIGS. 1 to 4, the front end 48 of base plate 49 is further provided with a continuous bore 78 which extends parallel to the plane of the base plate 49 and vertically to the direction of movement of the saw. This bore 78 is adapted to receive a rod 79 which has on one end a guide or stop member 81 for engaging with a workpiece. At each side of the projection 74 a transverse tapped bore 82 terminates into bore 78 and each of these transverse bores 82 contains a thumbscrew 83 for clamping the stop rod 79 in any desired position. Rod 79 may be inserted either into one or the other end of bore 78 and be clamped by the respective thumbscrew 83 near this end.

When a sawing operation is to be carried out with the saw as previously described, at first the blade guard 54 is shifted by knob 63 toward the right and away from saw blade 2 against the action of spring 56 so that the locking projection 58 disengages from recess 61. Blade guard 54 will then be pivoted upwardly against the torsion of spring 56 merely by its engagement with the workpiece during the forward movement of the saw. Due to the weight of the blade guard 54 and the torsion of spring 56, blade guard 54 will then rest with its edge 54" continuously on the workpiece until the sawing cut has been completed.

If motor 12 is driven, so that the friction wheel 6 revolves in the direction of the arrow 84, as shown in FIG. 9, a reaction force 85 will act upon the drive shaft 11 of the friction wheel which depends upon the load which is exerted upon the saw blade 2 which like the tension of spring 17 produces a torque which presses the friction wheel 6 against the saw blade 2. The same is caused by a feeding force which is exerted on the handle 18 in the direction of the arrow 86. Consequently, the contact pressure of friction wheel 6 will never be greater than required by the particular load acting upon the saw blade 2. This, in turn, means that the various bearings will only be subjected to a relatively small load and a low friction and will therefore not be highly heated and will last for a long time. The total length of service of the saw according to the invention will therefore be considerably longer than that of other circular saws with annular saw blades according to prior designs.

When after the completion of a cut, the saw is lifted off the workpiece, the blade guard 54 is pivoted by its weight and the torsion of spring 56 to the guarding position in which the end 67 of groove 65 engages upon pin 66 and the projection 58 engages into the recess 61 so that the edge 54' of the blade guard covers the teeth of the saw blade.

Although our invention has been illustrated and described with reference to the preferred embodiment thereof, we wish to have it understood that it is in no way limited to the details of such embodiment, but is capable of numerous modifications within the scope of the appended claims.

We claim:

1. A circular saw comprising a housing, an annular saw blade partly disposed within said housing and partly projecting therefrom, a plurality of rollers mounted in said housing and adapted to engage upon and rotate along the opposite sides of said saw blade for guiding the same, a motor connected to and supported by said housing, at least one friction drive wheel rotatable about its axis and adapted to be driven by said motor to engage with said saw blade for driving the same, and means for mounting said drive wheel so as to be capable of swiveling about an axis spaced from and substantially parallel to said wheel axis, said swivel axis being spaced from the plane of said saw blade at a distance greater than the length of the radius of said drive wheel and less than the sum of said length and the distance between said wheel axis and said swivel axis, said wheel axis being disposed behind said swivel axis, as seen in the direction of movement of the surface of said drive wheel engaging with said saw blade.

2. A circular saw comprising a housing, an annular saw blade partly disposed within said housing and partly projecting therefrom, a plurality of rollers mounted in said housing and adapted to engage upon and rotate along the opposite sides of said saw blade for guiding the same, a motor connected to and supported by said housing, at least one friction drive wheel rotatable about its axis and adapted to be driven by said motor to engage with said saw blade for driving the same, means for mounting said drive wheel so as to be capable of swiveling about an axis spaced from and substantially parallel to said wheel axis, said swivel axis being spaced from the plane of said saw blade at a distance greater than the length of the radius of said drive wheel and less than the sum of said length and the distance between said wheel axis and said swivel axis, said wheel axis being disposed behind said swivel axis, as seen in the direction of movement of the surface of said drive wheel engaging with said saw blade, and spring means acting upon said mounting means of said drive wheel to press said wheel against said saw blade.

3. A circular saw comprising a housing, an annular saw blade partly disposed within said housing and partly projecting therefrom, a plurality of rollers mounted in said housing and adapted to engage upon and rotate along the opposite sides of said saw blade for guiding the same, a drive unit comprising a motor having a shaft, and a friction drive wheel mounted on said shaft and having an axis coaxial with said shaft and adapted to engage with said saw blade for driving the same, and means for pivotably connecting said drive unit to said housing so as to be capable of swiveling about an axis spaced from and substantially parallel to said wheel axis, said swivel axis being spaced from the plane of said saw blade at a distance greater than the length of the radius of said drive wheel and less than the sum of said length and the distance between said wheel axis and said swivel axis, and wheel axis being disposed behind said swivel axis, as seen in the direction of movement of the surface of said drive wheel engaging with said saw blade.

4. A circular saw comprising a housing, an annular saw blade partly disposed within said housing and partly projecting therefrom, a plurality of rollers mounted in said housing and adapted to engage upon and rotate along the opposite sides of said saw blade for guiding the same, a drive unit comprising a motor having a shaft, and a friction drive wheel mounted on said shaft and having an axis coaxial with said shaft and adapted to engage with said saw blade for driving the same, means or pivotably connecting said drive unit to said housing, so as to be capable of swiveling about an axis spaced from and substantially parallel to said wheel axis, said swivel axis being spaced from the plane of said saw blade at a distance greater than the length of the radius of said drive wheel and less than the sum of said length and the distance between said wheel axis and said swivel axis, said wheel axis being disposed behind said swivel axis, as seen in the direction of movement of the surface of said drive wheel engaging with said saw blade, and spring means connecting said drive unit to said housing for drawing said drive wheel into engagement with said saw blade.

5. A circular saw comprising a housing, an annular saw blade partly disposed within said housing and partly projecting therefrom, a plurality of rollers mounted in said housing and adapted to engage upon and rotate along the opposite sides of said saw blade for guiding the same, a motor connected to and supported by said housing, at least one friction drive wheel adapted to engage with said saw blade for driving the same and having a shaft connected to and adapted to be driven by said motor, bearing means for rotatably mounting said shaft, at least one handle rigidly secured to said bearing means for manipulating said saw, and means for pivotally connecting said bearing means to said housing so as to be capable of swiveling about an axis spaced from and substantially parallel to said shaft axis, said swivel axis being spaced from the plane of said saw blade at a distance greater than the length of the radius of said drive wheel and less than the sum of said length and the distance between said shaft axis and said swivel axis, said shaft axis of said drive wheel being disposed behind said swivel axis, as seen in the direction of movement of the surface of said drive wheel engaging with said saw blade.

6. A circular saw comprising a housing, an annular saw blade partly disposed within said housing and partly projecting therefrom, a plurality of rollers mounted in said housing and adapted to engage upon and rotate along the opposite sides of said saw blade for guiding the same, a motor connected to and supported by said housing, at least one friction drive wheel adapted to be driven by said motor and to engage with said saw blade for driving the same, a blade guard at one side of said saw blade, means connecting said blade guard to said housing and having an axis extending perpendicularly to the plane of said saw blade, said blade guard being pivotable about said axis relative to said housing and also being slidable along said axis relative to said saw blade, spring means acting upon said blade guard for pressing the same in the direction toward the plane of said saw blade, said housing having a surface with a recess therein, and a projection on said blade guard, said projection in one position of said blade guard being adapted under the action of said spring means to slide into said recess whereby said blade guard is locked in said position in which it surrounds and guards the exposed part of said saw blade, said projection when withdrawn from said recess and when said blade guard is pivoted to any other position about the axis of said connecting means being adapted under the action of said spring to engage with said surface, whereby said blade guard is maintained at a short distance from the outer plane surface of said saw blade.

7. The circular saw, as set forth in claim 6, in which said spring means are also adapted to produce a torque tending to return said blade guard from any pivoted position over the plane side of said saw blade to said guarding position.

8. A circular saw comprising a housing, an annular saw blade partly disposed within said housing and partly projecting therefrom, said housing covering a range of said blade smaller than 180°, a plurality of rollers mounted in said housing and adapted to engage upon and rotate along the opposite sides of said saw blade for guiding the same, a motor connected to and supported by said housing, at least one friction drive wheel adapted to be driven by said motor and to engage with said saw blade for driving the same, a blade guard at one side of said saw blade, means connecting said blade guard to said housing and having an axis extending perpendicularly to the plane of said saw blade, said blade guard being pivotable about said axis relative to said housing, a work-engaging plate pivotably connected to said connecting means and adapted to be pivoted about said axis of said connecting means for adjusting said plate to any desired cutting depth of said saw blade, means for also permitting said plate to be pivoted about an axis parallel to the plane of said saw blade, means for locking said plate in any adjusted position about either of said axes, and means for mounting said drive wheel so as to be capable of swiveling about an axis spaced from and substantially parallel to said wheel axis, said swivel axis being spaced from the plane of said saw blade at a distance greater than the length of the radius of said drive wheel and less than the sum of said length and the distance between said wheel axis and said swivel axis, said wheel axis being disposed behind said swivel axis, as seen in the direction of movement of the surface of said drive wheel engaging with said saw blade.

9. A circular saw comprising a housing, an annular saw blade partly disposed within said housing and partly projecting therefrom, a plurality of rollers mounted in said housing and adapted to engage upon and rotate along the opposite sides of said saw blade for guiding the same, a motor connected to and supported by said housing, at least one friction drive wheel adapted to be driven by said motor and to engage with said saw blade for driving the same a blade guard at one side of said saw blade, means connecting said blade guard to said housing and having an axis extending perpendicularly to the plane of said saw blade, said blade guard being pivotable about said axis relative to said housing, a work-engaging plate pivotably connected to said connecting means and adapted to be pivoted about said axis of said connecting means for adjusting said plate to any desired cutting depth of said saw blade, stop means at least on one end of said blade guard, means for also permitting said plate to be pivoted about an axis extending parallel to the plane of said saw blade and comprising a pivot pin mounted on said housing and extending parallel to said plane, said plate being pivotable about said pivot pin, said pivot pin being also adapted to engage with said stop means to limit the extent of the pivoting movement of said blade guard, and means for locking said plate in any adjusted position about either of said axes.

10. A circular saw comprising a housing, an annular saw blade partly disposed within said housing and partly projecting therefrom, a plurality of rollers mounted in said housing and adapted to engage upon and rotate along the opposite sides of said saw blade for guiding the same, a motor connected to and supported by said housing, at least one friction drive wheel adapted to be driven by said motor and to engage with said saw blade for driving the same, a blade guard at one side of said saw blade, means connecting said blade guard to said housing and having an axis extending perpendicularly to the plane of said saw blade, said blade guard being pivotable about said axis relative to said housing and also being slidable along said axis relative to said saw blade, in order to move said blade guard into operative position during operation of said saw, a work-engaging plate pivotably connected to said connecting means and adapted to be pivoted about said axis of said connecting means for adjusting said plate to any desired cutting depth of said saw blade, stop means at least on one end of said blade guard, means for also permitting said plate to be pivoted about an axis extending parallel to the plane of said saw blade and comprising a pivot pin mounted on and slidable in its axial direction relative to said housing and extending parallel to said plane, said plate being at all times pivotably connected to said pivot pin, a spring acting upon said pivot pin so as normally to maintain the same in a position in which it is adapted to engage with said stop means to limit the extent of the pivoting movement of said blade guard, said pivot pin being adapted to be retracted against the action of said spring so as not to engage with said stop means to permit said blade guard to be swung to a position beyond said stop means, and means for locking said plate in any adjusted position about either of said axes.

11. The circular saw, as set forth in claim 9, in which said stop means when engaging with said pivot pin determined a position of said blade guard in which the lower edge of said blade guard is substantially in alignment with the lower surface of said plate.

12. A circular saw comprising a housing, an annular saw blade partly disposed within said housing and partly projecting therefrom, a plurality of rollers mounted in said housing and adapted to engage upon and rotate along the opposite sides of said saw blade for guiding the same, bearing means for each of said rollers, at least one of said rollers together with said bearing means thereof forming a structural unit, means for removably securing said unit in said housing, a motor connected to and supported by said housing, and at least one friction drive wheel adapted to be driven by said motor and to engage with said blade for driving the same, the wall of said housing having at least one aperture, a bushing having an eccentric bore within said aperture, said unit being mounted in said bore of said bushing and adapted to be adjusted in a direction perpendicular to its axis when said bushing is turned about its axis, said securing means comprising at least one threaded member for securing said unit to said housing and for locking said bushing and said unit in any position of adjustment of said bushing.

13. A circular saw comprising a housing having two parts, an annular saw blade partly disposed between said parts and partly projecting therefrom, means for pivotably connecting said parts to each other so that a first of said parts is pivotable relative to the second part about an axis extending parallel to the plane of said saw blade, locking means for securing said two parts to each other when pivoted toward each other, a plurality of rollers mounted in said two housing parts opposite to each other and adapted to engage upon and rotate along the opposite sides of said saw blade for guiding the same when said first housing part is locked to said second part, and a motor connected to and supported by said housing, at least one of said rollers forming a friction drive wheel adapted to be driven by said motor and to engage with said saw blade for driving the same.

14. A circular saw comprising a housing having two parts, an annular saw blade partly disposed between said parts and partly projecting therefrom, means for pivotably connecting a first of said parts to the second part so as to be pivotable relative to the second part about an axis extending parallel to the plane of said saw blade, locking means for securing said two parts to each other when said first part is pivoted to the closed position toward the second part, a plurality of rollers mounted in said two housing parts opposite to each other and adapted to engage upon and rotate along the opposite sides of said blade for guiding the same when said first housing part is locked to said second housing part, said saw blade and said rollers being easily replaceable when said first housing part is pivoted to the open position, a drive unit comprising a motor having a shaft, and a friction drive wheel mounted on said shaft and having an axis coaxially with said shaft and adapted to engage with said saw blade for driving the same, means for pivotably connecting said drive unit to said second housing part so as to be capable of swiveling about an axis spaced from and substantially parallel to said wheel axis, a lever rigidly secured to said first housing part and having a free end pivotable toward said second part when said first part is being opened, and spring means connected at one end to said drive unit and having a hook-shaped second end adapted to be hooked upon said free end of said lever when said first housing part is being closed, whereby said spring is tightened to its proper tension to draw said drive wheel into engagement with said saw blade, said spring means being released and said hook-shaped end being automatically disconnected from said levers when said first housing part is being opened.

15. A circular saw comprising
a housing,
an annular saw blade partly disposed within said housing and partly projecting therefrom,
said housing covering a range of said saw blade smaller than 180°,
a plurality of rollers mounted in said housing and adapted to engage upon and rotate along the opposite sides of said saw blade for guiding the same, a motor connected to and supported by said housing,
a least one friction drive wheel adapted to be driven by said motor and to engage with said saw blade for driving the same,
a blade guard at one side of said saw blade, and
means connecting said blade guard to said housing and having an axis extending perpendicularly to the plane of said saw blade,
said blade guard being pivotable about said axis relative to said housing, and
means for mounting said drive wheel so as to be capable of swiveling about an axis spaced from and substantially parallel to said wheel axis,
said swivel axis being spaced from the plane of said saw blade at a distance greater than the length of the radius of said drive wheel and less than the sum of said length and the distance between said wheel axis and said swivel axis,
said wheel axis being disposed behind said swivel axis, as seen in the direction of movement of the surface of said drive wheel engaging with said saw blade.

References Cited by the Examiner

UNITED STATES PATENTS

| | | | |
|---|---|---|---|
| 1,740,074 | 12/1929 | Crowe | 143—159.6 X |
| 1,803,068 | 4/1931 | McKeage | 143—43—1.5 |
| 1,830,580 | 11/1931 | Wappat | 143—43—6.5 |
| 1,848,330 | 3/1932 | Emmons | 143—159.6 X |
| 2,635,650 | 4/1953 | Smith | 143—44 |
| 2,701,590 | 2/1955 | Barker | 143—44 |
| 2,972,363 | 2/1961 | Santilli | 143—44 |

FOREIGN PATENTS

| | | |
|---|---|---|
| 532,387 | 11/1921 | France. |
| 70,233 | 9/1930 | Sweden. |

ROBERT C. RIORDON, *Primary Examiner.*

EARL EMSHWILLER, LESTER M. SWINGLE,
*Examiners.*